United States Patent
Jensen

[11] Patent Number: 5,134,655
[45] Date of Patent: Jul. 28, 1992

[54] HEADPHONE WITH MICROPHONE

[76] Inventor: Jorgen W. Jensen, Niels Juelsvej 18, Solrod Strand, Denmark, DK-2680

[21] Appl. No.: 613,916
[22] PCT Filed: Jun. 30, 1989
[86] PCT No.: PCT/DK89/00165
    § 371 Date: Dec. 12, 1990
    § 102(e) Date: Dec. 12, 1990
[87] PCT Pub. No.: WO90/00340
    PCT Pub. Date: Jan. 11, 1990

[30] Foreign Application Priority Data
Jul. 1, 1988 [DK] Denmark ............... 3676/88

[51] Int. Cl.[5] .................. H04M 1/00; H04R 25/00
[52] U.S. Cl. .................... 379/430; 381/183; 381/187
[58] Field of Search ........... 379/430, 433; 381/183, 381/187, 68.7, 74

[56] References Cited
U.S. PATENT DOCUMENTS

| | | | |
|---|---|---|---|
| 3,862,378 | 1/1975 | Norris | 379/430 |
| 4,020,297 | 4/1977 | Brodie | 379/430 |
| 4,039,765 | 8/1977 | Tichy et al. | 379/430 |
| 4,893,344 | 1/1990 | Trägardh et al. | 379/430 |
| 4,932,052 | 1/1990 | Lo | 379/430 |

FOREIGN PATENT DOCUMENTS 2096861  10/1982  United Kingdom ............... 381/183

Primary Examiner—James L. Dwyer
Assistant Examiner—Jason Chan
Attorney, Agent, or Firm—Watson, Cole, Grindle & Watson

[57] ABSTRACT

A headphone with microphone which is particularly suitable for use in connection with telephone apparatus includes a carrying ear hanger having a disc member which is adapted to the back of the ear and a hook member that extends forward on the topside of the ear when in a working position. A microphone and earphone are placed in a microtelephone arm which is connected to the ear hanger via a hinge, and a spring connected with the hinge holds the earphone against a user's ear and thus the microphone close to the user's mouth.

6 Claims, 1 Drawing Sheet

HEADPHONE WITH MICROPHONE

BACKGROUND OF THE INVENTION

The present invention relates to a headphone with a microphone, particularly for use instead of the handsets of telephone apparatus, and comprising a microphone, an earphone and means for maintaining the headphone on the head of the user, the maintaining means comprising a carrying ear hanger in the form of a disc-like member adapted to the back of the ear and a hook member extending forward on the topside of the ear when in a working position.

Different headphones, so-called handfree headsets or headphones, are well known wherein one or two earphones (telephones) are mounted on a band which is placed above or below the head of the user, while a microphone is placed in an arm which is cantilevered by the band and in such a manner that it can be turned to a position in front of the user's mouth. Such headphones are fairly complicated to place in position on the head and to remove again, and adjustment is usually always required with each use. However, they are particularly inexpedient in that the band when carried above the head collides with the hair style, and when carried below the head the entire weight of the headset is carried by the auditory ducts of the user via the attachment of the earpieces. In this connection, a further considerable drawback consists of the constant pressure exerted on the ears, causing nuisance by long term use, e.g., a whole day.

Another prior art headphone of the above-mentioned type (see, for example, U.S. Pat. No. 3,548,118) consists of a housing of the behind-the-ear-hearing-aid-type which is placed behind the ear and having tube or conduit connections to the microphone and earphone, respectively, the latter transmitting sound via a conduit which is inserted into the auditory duct and being fixed in the duct with a conventional earplug. One drawback of this construction is that the ear plug inserted into the ear exerts a constant pressure in the auditory duct and it becomes dirty from earwax, so that for hygienic reasons it can normally only be used by one person but has to be replaced when used by others. The insertion of such a foreign body constituted by the earplug into the auditory duct may sometimes cause the development of eczema or other irritations. The use of such headphones with earplugs will normally be restricted to a limited period due to the pressure and/or irritation. Finally, also the actual placing of the headphone on the user's head is fairly complicated.

This is not the case in a further known headphone with microphone which is maintained on the user's head solely by an earplug in connection with the earphone (telephone) which is inserted into the auditory duct. The telephone is provided with an arm which extends towards the user's mouth when in a working position and which at the end carries the microphone. This embodiment is inexpedient like the previous one in that the earplug becomes dirty from earwax and furthermore causes the above-mentioned pressure and skin nuisances, and the entire headset is carried by the earplug which rests in the auditory duct.

DE-A 3.208.497 discloses a headphone comprising an on an arm which is connected to an ear hanger via a spring-loaded hinge and a connecting member keeping a given distance between the ear hanger and the earphone. When the headphone is in working position, the arm carrying the earphone and the axis of the hinge are substantially vertical to enable the earphone to be pivotally adjusted in the horizontal plan relative to the ear hanger to an appropriate angular position against the ear.

In a still further prior art headphone with microphone (see U.S. Pat. No. 3,862,378) the earphone is located in a housing intended for placing in front of and upon the user's ear. A mouth tube extends from the housing towards the user's mouth where it is provided with a microphone. An ear hook is pivotally connected to the housing and is urged by a spring against the back of the ear towards the housing so that the ear is kept clamped between the housing and the ear hook.

SUMMARY OF THE INVENTION

The drawbacks of the above-mentioned constructions are avoided by the headphone according to the invention which is characterized in that the earphone and the microphone are located in a microtelephone arm connected via a spring-loaded hinge to the ear hanger, the axis of the hinge being substantially parallel to the plane of the ear hanger and substantially perpendicular to the longitudinal direction of the microtelephone arm.

Such a headphone is advantageous inter alia in that nothing is inserted into the auditory duct. The spring-loaded hinge ensures that the earphone from outside fits tightly to the ear and at the same time holds the microphone in the correct position. The placing of the headphone onto the user's head is very simple as the ear hanger is simply placed above and behind the ear while the microtelephone arm is in the open position. The arm is subsequently turned inwards to its working position and normally no adjustment is required afterwards. Thus, the headphone has the simplicity which is required since such a headphone will be put on and taken off several times a day. As the entire headphone can be designed with a very low weight and as no pressure is exerted on or in the ear, the headphone may thus be used continuously for long periods.

In an embodiment according to the invention the ear hanger can be converted to the right and left ear, respectively, by a simple operation which can be performed by the user without auxiliary tools with the subsequent advantages in connection with simplified storage of components, etc.

In a further embodiment according to the invention the disc and hook members of the ear hanger are pivotably mounted on the microtelephone arm and an interpiece mounted on the arm, respectively. Thus, the conversion may be effected in a simple manner without the use of tools. This also applies to another embodiment wherein the hook member is detachably connected with one or the other end of the disc member of the ear hanger which in this case is symmetrically formed and mounted in relation to the microtelephone arm.

Even though the ear hanger will suit most users' ears, the disc member of the ear hanger may be subject to some adjustability in relation to the microtelephone arm so that precise adaption to the ear will always be obtainable.

Of course, the earphone must be placed against the auditory duct when in working position and this will normally happen right away, but according to the invention the earpiece located outside the earphone may be excentrically rotatably connected with the microtelephone arm, thus making it possible to compensate for any small deviations with regard to the location of the auditory duct of some persons.

To facilitate the placing of the headphone, the microtelephone arm may have an open, turned away resting position in relation to the ear hanger. Thus, the headphone may be easily placed on the ear and subsequently the microtelephone arm may be brought from resting position to abutting position against the ear.

BRIEF DESCRIPTION OF THE DRAWINGS

The invention will now be explained in further detail with reference to the drawing wherein.

DETAILED DESCRIPTION OF THE PREFERRED EMBODIMENTS

Figure 1:
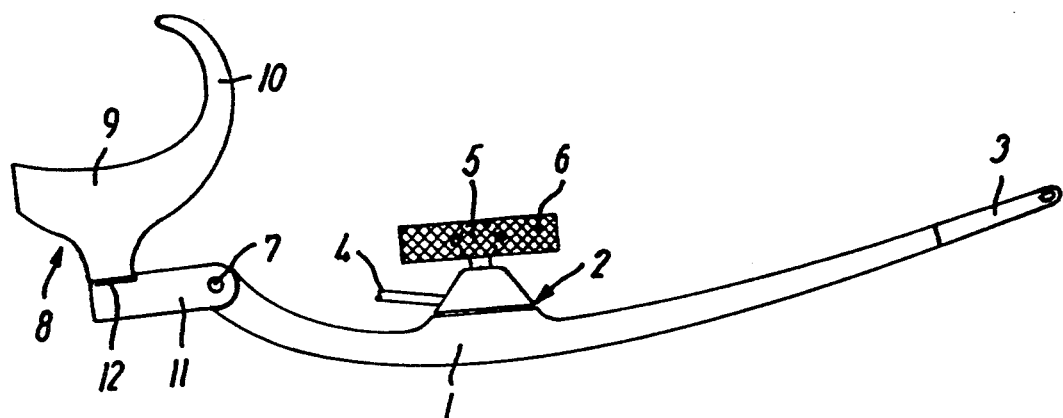
FIG. 1 shows an embodiment of a headphone with microphone according to the invention in a side view and with the ear hanger turned away from working position and placed in an intermediate position between the right and left position.
Figure 2:
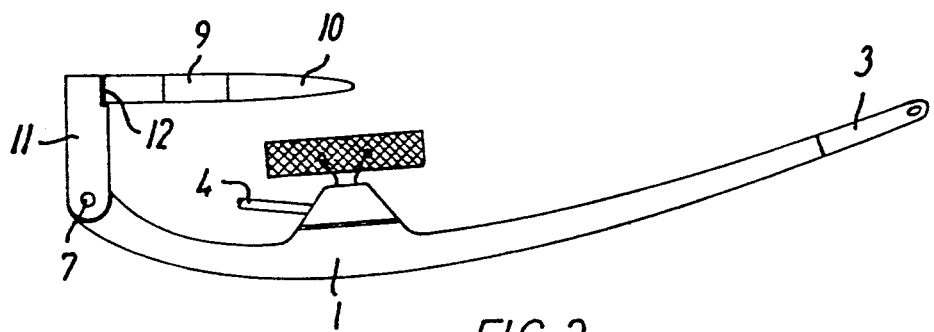
FIG. 2 shows the same headphone with the ear hanger in a working position turned 90° in relation to FIG. 1.

The headphone shown in FIGS. 1 and 2 of the drawing consists of a microtelephone arm 1 wherein cavities at 2 and 3 are provided with an earphone and a microphone, respectively, which may be of conventional miniature size. The microphone and earphone are connected with a telephone apparatus via a cord 4. The microphone and the earphone may optionally be mounted on the arm 1 via a connector for easy replacement in case of defect or damage.

In connection with the earphone (at 2) the arm 1 is provided with a projection 5 having a sound exit. As shown, the projection may be spherical and is designed to carry a detachable, replaceable earpiece 6, e.g. of plastics, foam material or the like, in various sizes and shapes as generally known to fit against the user's ear.

The arm 1 is via a hinge 7 connected with an ear hanger which is generally designated by 8 and which comprises an ear hanger disc member 9 determined to be placed behind the user's ear, the internal curve of the disc corresponding to the curve of the back of the ear. The disc member 9 has an extension in the form of a hook member 10 which during operation extends over the ear so that the members 9 and 10 together ensure that the headphone is hooked on the ear in a stable and safe manner.

In the embodiment of FIGS. 1 and 2 the members 9, 10 are not directly but via an interpiece 11 connected to the microtelephone arm 1, the one end of the interpiece forming part of the hinge 7 in which a spring means is placed (not shown in the drawing) holding the earpiece 6 against the user's ear once the headphone is positioned. In connection with the spring means the hinge may furthermore have an open resting position wherein the microtelephone arm remains turned away from the user's head until it is passed into a working position.

The ear hanger 8-10 is connected with the other end of the interpiece 11 via a pivot joint 12 comprising also a spring means (not shown) which maintains the ear hanger in its rotational positions and yet permits these. In this simple manner the ear hanger can be adapted to use on either the right or left ear. By means of clearances in the hinge a slight displacement is possible of the disc member 9, 10 in relation to the end of the interpiece so that a small adjustment to the user's ear is obtained, thus making it possible to place the earphone exactly in line with the auditory duct. By means of intermeshing cams and dents on the surfaces facing each other on the ear hanger and the end portion of the interpiece, respectively, the displacement position in the hinge can be maintained.

A further adjustment may be provided by an eccentrically rotatable mounting of the projection 5 opposite the earphone.

Figure 3:
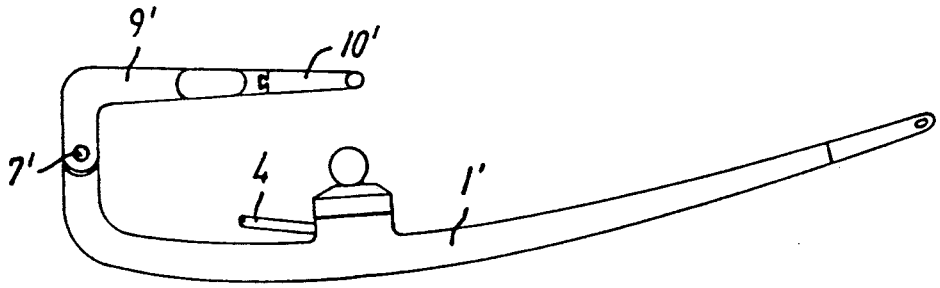
FIG. 3 shows another embodiment of the headphone according to the invention in view similar to FIG. 2
Figure 4:
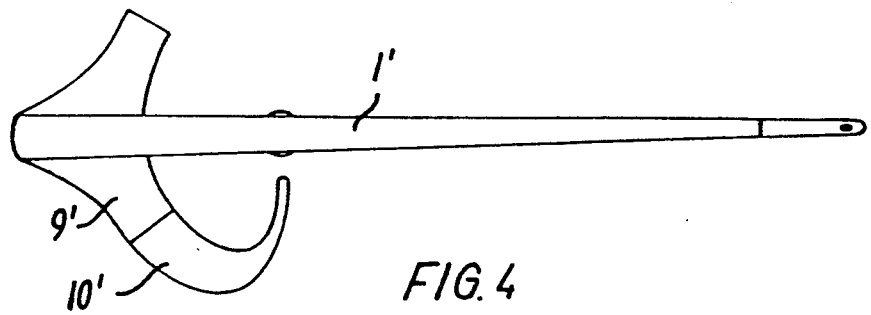
FIG. 4 shows the embodiment of the FIG. 3 seen from below.

In another embodiment according to the invention shown in FIGS. 3 and 4, the interpiece 11 shown in FIG. 1 is replaced by extensions of the arm 1' and the ear hanger 8 which are directly connected via a hinge 7' with a spring means corresponding to the hinge 7 shown in FIGS. 1 and 2.

In this case the hook member 10' of the ear hanger constitutes a separate part which can be selectively connected with one or the other end of the disc symmetrically formed member 9', e.g., by means of a dovetail joint, thus making it possible to change the headphone to a left and right ear device, respectively. The pivot joint 12 shown in FIGS. 1 and 2 may thus be eliminated.

The invention provides a handfree microtelephone having a low weight and which is extremely simple to place on the head and to remove. The user himself can adapt the headphone to either the right or left ear without the use of any tools just as the other adjustments mentioned above can be made, if desired. As the low weight of the unit is exclusively carried by the outer ear, the headphone can be used the whole day without nuisance of any kind.

The headphone can be modified by leaving out the microphone part, e.g. by ending the microphone arm 1 immediately after the earphone 2, thus making it possible to use the headphone as an earphone alone, e.g. in connection with dictation machine where the easy placing of the headphone onto the head and the comfortable wear without any pressure or other nuisances will be particularly advantageous for long term use.

I claim:

1. A headphone with a microphone, particularly for use in connection with telephone apparatus, and comprising a microphone, an earphone and means for maintaining the headphone on the user's head, said maintaining means comprising a carrying ear hanger in the form of a disc-like member adapted to the back of the ear and a hook member extending forward on the topside of the ear when in working position, wherein the earphone and the microphone are located in a microtelephone arm connected via a spring-loaded hinge to the ear hanger, the axis of said hinge being substantially parallel to the plane of said ear hanger and substantially perpendicular to the longitudinal direction of the microtelephone arm.

2. A headphone according to claim 1, wherein the ear hanger is convertible to the right and left ear, respectively.

3. A headphone according to claim 2, wherein the disc member and the hook member of the ear hanger are pivotably mounted on the microtelephone arm.

4. A headphone according to claim 2, wherein the hook member is detachably connected with one or the other end of the disc member of the ear hanger, which is symmetrically formed and mounted in relation to the microtelephone arm.

5. A headphone according claim 1, wherein the ear hanger has an open, turned away resting position.

6. A headphone according to claim 2, including an interpiece connected to said microtelephone arm and wherein said ear hanger is pivotally mounted on said interpiece.

* * * * *